Feb. 17, 1942.   J. H. THOMPSON   2,273,478
VARIABLE SPEED DEVICE
Filed Jan. 18, 1939
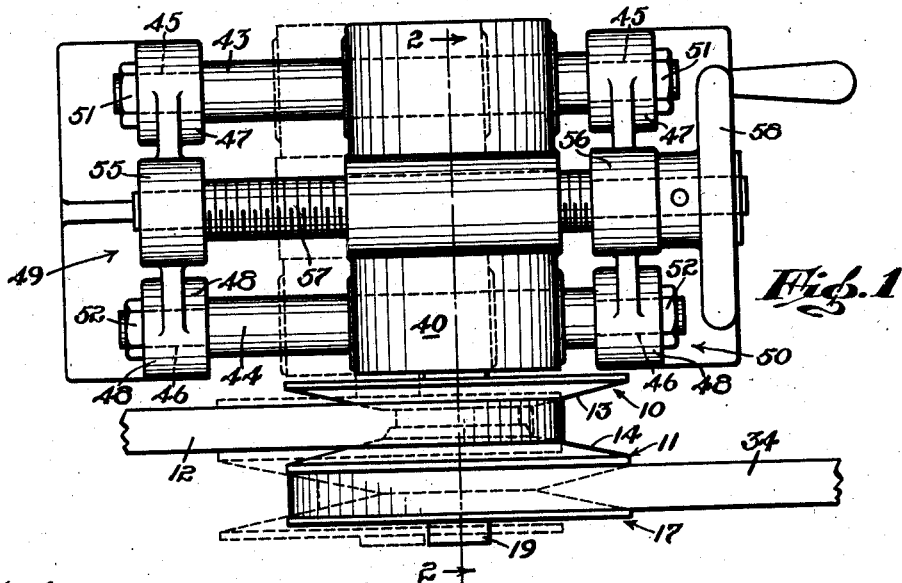
Fig. 1
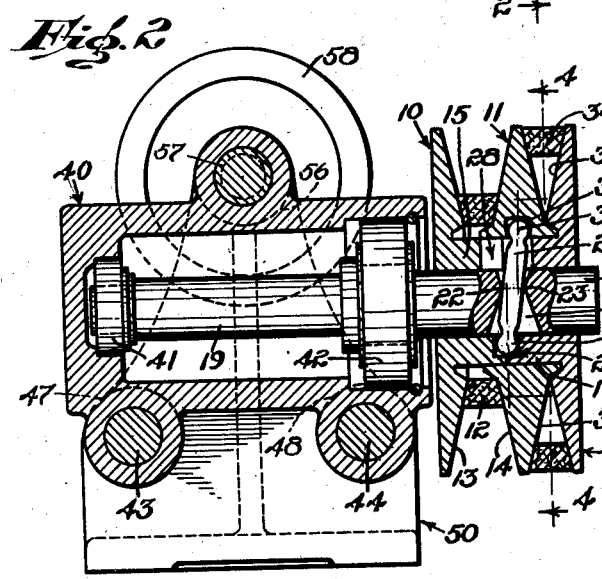
Fig. 2
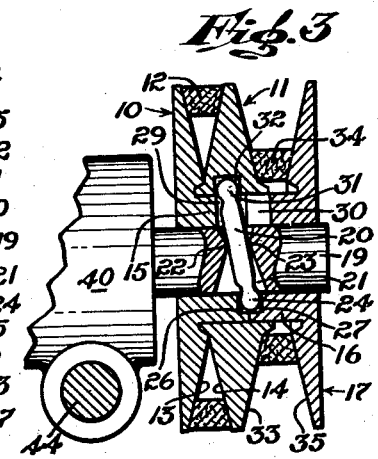
Fig. 3
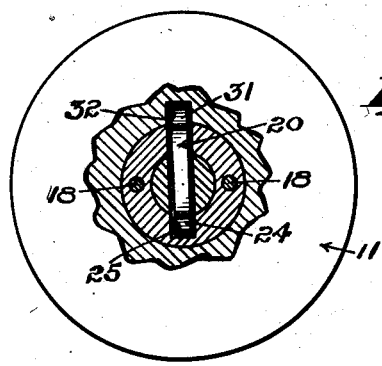
Fig. 4
Fig. 5
Inventor
John H. Thompson
By R. W. Weilein
Attorney Patented Feb. 17, 1942

2,273,478

UNITED STATES PATENT OFFICE 2,273,478

VARIABLE SPEED DEVICE

John H. Thompson, Glendale, Calif., assignor to Eric Locke, Los Angeles, Calif.

Application January 18, 1939, Serial No. 251,552

4 Claims. (Cl. 74—230.17)

This invention relates to variable speed devices, particularly devices of the type employing expansible pulleys and belts engageable with the pulley faces at various effective diameters to alter the transmission ratio.

It is an object of the invention to provide an improved expansible pulley device having pulley sections relatively movable to alter the effective contacting diameters of a belt engageable therewith, and in which the plane of movement of the belt is maintained substantially constant upon its radial displacement by the pulley sections.

Another object of the invention is the provision of an improved variable speed device having a plurality of expansible pulleys engageable with belts positively movable in opposite directions along the contacting pulley faces upon relative displacement between the pulley sections.

A further object of the invention contemplates an improved variable speed device having a plurality of expansible pulleys engageable with belts to move them in opposite directions along the contacting pulley faces upon relative displacement between the pulley sections, the plane of movement of each belt being maintained substantially constant upon its radial displacement by the pulley sections.

Still a further object of the invention involves the embodiment of instrumentalities within an expansible pulley device for positively moving pulley sections substantially equal distances in opposite directions to vary its effective diameter upon a contacting belt while maintaining the plane of belt movement substantially constant.

Another object of the invention is to provide an improved means for shifting the rotational axis of an expansible pulley device in order to vary the effective diameter of the pulley with respect to a belt engageable therewith.

This invention possesses many other advantages and has other objects which may be made more easily apparent from a consideration of one embodiment of the invention. For this purpose there is shown a form in the drawing accompanying and forming part of the present specification. This form will now be described in detail, illustrating the general principles of the invention; but it is to be understood that this detailed description is not to be taken in a limiting sense, since the scope of the invention is best defined by the appended claims.

Figure 1 is a top plan view of a variable speed device embodying the present invention.

Figure 2 is a transverse section taken as indicated by line 2—2 of Figure 1.

Figure 3 is a view showing the expansible pulley structure of Figure 2 in another position of adjustment.

Figure 4 is a section through the pulley structure, taken along the line 4—4 of Figure 2, with the belt omitted; and Figure 5 is a fragmentary section showing the means employed for securing parts of the pulley structure together.

The variable speed device is essentially an expansible pulley mechanism consisting of opposed conical pulley sections 10 and 11, engageable with an endless belt 12, preferably of the V-type, whose side faces are contactible with the conical surfaces 13 and 14 of the pulley sections at various effective diameters to alter the transmission ratio. The pulley section 10 is provided with an extended hub 15 which is fixedly secured to the hub 16 of another pulley section 17 by screws 18, passing through the hub 16 and threaded into the hub 15, thereby providing a unitary structure slidably mounted on a rotatable shaft 19 and slidably supporting the pulley section 11. By moving the pulley sections 10 and 11 axially with respect to one another, their effective diameter upon the V-belt 12 can be varied.

The movement of the pulley sections 10 and 11 is positively controlled by means of a lever 20 serving as the agency for transmitting movement of one of the sections to the other section, and preferably in mutually opposite directions. The lever 20 is fulcrumed within a guide slot 21 in the shaft 19 upon knife edges 22 and 23 on opposite sides of the slot. The lever extends from its fulcrum in one direction with an associated rounded end 24 receivable within a recess 25 formed by the complementary pockets 26 and 27 in the confronting ends of the respective hubs 15 and 16. The other arm of the lever extends in the opposite direction from its fulcrum through an axially extended slot 28 formed by the complementary grooves 29 and 30 in the confronting ends of said hub, the rounded end 31 of said arm being engageable with the pulley section 11 within a recess 32 formed therein. The extended slot 28 in the hubs will permit movement of the pulley section 11 and its associated lever arm axially with respect to the other pulley section 10. In view of the fact that this hub slot serves as a guide for the lever arm with its sides closely embracing the sides of the arm, a slidable spline connection is provided between the pulley section 11 and the connected hubs upon which it is mounted. Similarly, the sides of the guide slot 21 in the shaft 19 closely embrace the other lever arm, axial extension of this slot permitting swinging of the lever arm about its fulcrum. This confined swinging movement in conjunction with the reception of the rounded lever end 24 within the recess 25 provides a slidable spline connection between the connected hubs 15, 16 and the shaft 19. The shaft 19 and pulley sections 10 and 11 are therefore mounted for unitary rotation and for relative axial displacement.

Axial movement of one of the pulley sections, caused by some convenient force, as the pressure exerted by the belt 12 upon the displacement of the pulley axis by means to be hereinafter described, will operate through the lever 20 to move the other pulley section in the opposite direction, since the lever is of the first class. This combined motion of the pulley sections 10 and 11 will alter the effective diameter of the pulley structure upon the engaging belt.

It is desirable that the pulley sections 10 and 11 move equal distances in opposite directions toward and away from each other in order to maintain the plane of movement of the belt 12 substantially constant as it is displaced radially along the engaging faces 13 and 14. Such motion will insure proper alignment of the belt 12 with another engaging pulley. The two arms of the lever 20 are therefore made of equal lengths so that equal angular movements of their rounded arm extremities 24 and 31 will produce equal axial displacements of the pulley sections 10 and 11 in opposite directions, and thereby maintain the path of movement of the belt 12 substantially constant regardless of its radial position upon the conical faces of the pulley sections.

It will be noted that one of the arms of the lever 20 must extend through the connected hubs 15, 16 into the pulley recess 32, whereas the other arm of said lever need only extend from the shaft into the hub recess 25. In view of this circumstance, equal lever arm lengths are readily obtainable by positioning the knife edges 22 and 23 forming the lever fulcrum to one side of the shaft axis.

Although heretofore described in connection with one set of pulley sections and one belt, the invention is susceptible for use with a plurality of belts and additional pulley sections. Thus, the pulley section 17 can be fixed to rotate with the pulley section 10 by means of the interconnected hubs 15, 16 previously described. The pulley section 11 slideable upon both of these hubs can be provided with a second conical face 33 operable upon another belt 34 in conjunction with the conical face 35 provided on the pulley section 17.

The lever 20 will operate upon the pulley sections 10 and 11 in the manner previously described, and it will also produce the required axial movement of the pulley section 17 in view of its connection with the pulley section 10. This lever 20 will likewise produce equal and opposite axial movements between the conical face 33 of the intermediate pulley section 11 and the conical face 35 on the pulley section 17, thus maintaining the plane of movement of the second belt 34 substantially constant upon its radial displacement under the influence of the axial movement imposed upon these pulley members. Since the intermediate pulley section 11 is common to both of the end pulley sections 13 and 17, the whole assembly can function as an intermediate transmission instrumentality to provide a large range of adjustments in the transmission ratios between driving and driven members. Thus, as the intermediate pulley section 11 is displaced axially, it will inversely alter the contacting positions of the belts 12 and 34 by increasing the effective diameter of one set of the pulley faces while simultaneously decreasing the effective diameter of the other set.

The formation of the recess 25 and the slot 28 in the confronting ends of the hubs 15 and 16, permits ease of assembly and disassembly of the pulley structure. The lever is easily insertable into proper position with respect to the shaft 19, intermediate pulley 11, and the hub 15, after which the pulley section 17 and its hub 16 can be placed in proper assembled relationship with respect to the lever 20 and other pulley elements, and then fastened to the hub 15 by means of the screws 18. Conversely, removal of the screws 18 will permit disassembly of the pulley section 17 and removal of the lever 20, after which the remaining pulley sections 10 and 11 can be withdrawn from the shaft and separated from each other.

Changes in the effective pulley diameters can be performed in various ways. In the specific example shown in the drawing, the necessary alteration is made by changing the axis of rotation of the pulley shaft 19 with respect to the axes of rotation of other cooperable pulley members (not shown). The shifting device for the shaft 19 and pulley axis includes a carrier 40 in which are mounted a plurality of bearings 41 and 42 rotatably mounting the pulley shaft. This carrier is adapted to slide upon a plurality of guide rods 43 and 44 having reduced ends 45 and 46 fitting into the bosses 47 and 48 provided on the spaced supporting brackets 49 and 50, which can be suitably secured to a stationary member (not shown). The guide rods 43 and 44 are held in position by means of the nuts 51 and 52 threaded on their reduced ends 45 and 46. The upper portions of the brackets 49 and 50 are provided with bosses 55 and 56 in which is rotatably mounted a feed screw 57, passing through and having threaded engagement with the pulley shaft carrier 40. Suitable means in the form of a hand wheel 58 is fixed to the feed screw 57 to produce its rotation in either direction, and effect corresponding axial movement of the carrier, which is guided by both the rods 43 and 44 and the feed screw 57, to effect a displacement of the pulley axis with respect to the axes of the cooperable pulley members (not shown). The pitch of the threads on said feed screw is such as to provide self locking engagement between said screw and the carrier 40 to hold the pulley axis in any position to which it has been adjusted.

As will be seen from an inspection of Figure 2, the bracket bosses 45 and 46, guide rods 43 and 44, and feed screw 57, are spaced with respect to one another to form a triangular arrangement. If the bosses were so arranged as to form an equilateral triangle, the supporting brackets could be mounted in various positions with respect to the carrier, permitting disposition of the carrier, shaft and pulley mechanisms in various positions with respect to the base portions of the brackets. For example, the feed screw 57 could be interchanged with one of the guide rods, which would cause the carrier, cooperably with the pulley shaft, to assume a different angle with respect to the base portion of the brackets. The supporting brackets can therefore be mounted on a supporting structure in different angular positions.

I claim:

1. A variable speed device including a shaft, a first pulley section having an extended sectional hub slideably mounted on said shaft for rotation therewith, a second pulley section slideably mounted on said hub for rotation therewith, said shaft and hub having aligned slots, a lever fulcrumed on said shaft within its slot and extending from its fulcrum in one direction through said slots with an end engageable with said second pulley section in a recess therein and extending from its fulcrum in another direction with an end engageable with said hub in a recess therein, said hub slot and recess being defined by adjacent hub sections to permit assembly and disassembly of the pulley structure.

2. A variable speed device including pulley means comprising a pair of opposed pulley sections secured together for unitary axial movement upon a rotatable member, an intermediate pulley section mounted for axial movement upon said pulley means, and lever means extending through and fulcrumed in said member and engageable with said intermediate section and pulley means for moving said intermediate section and pair of sections axially toward and away from each other.

3. A variable speed device including a shaft, a pair of opposed pulley sections having confronting hubs secured together for unitary axial movement upon said shaft, an intermediate pulley section mounted for axial movement upon said hubs, said shaft and hubs having aligned slots, a lever fulcrumed on said shaft within its slot and extending in one direction through said hub slot into engagement with said intermediate pulley section and in another direction into engagement with one of said hubs.

4. A variable speed device including a shaft, a pair of opposed pulley sections having confronting hubs secured together for unitary axial movement upon said shaft, an intermediate pulley section mounted for axial movement upon said hubs, said shaft and hubs having aligned slots, a lever fulcrumed on said shaft within its slot and extending from its fulcrum in one direction through said slot with an end engageable with said intermediate pulley section in a recess therein and extending from its fulcrum in another direction with an end engageable with said hubs in a recess therein, said hub slot and recess being defined by adjacent hub sections to permit assembly and disassembly of the pulley structure.

JOHN H. THOMPSON.